UNITED STATES PATENT OFFICE.

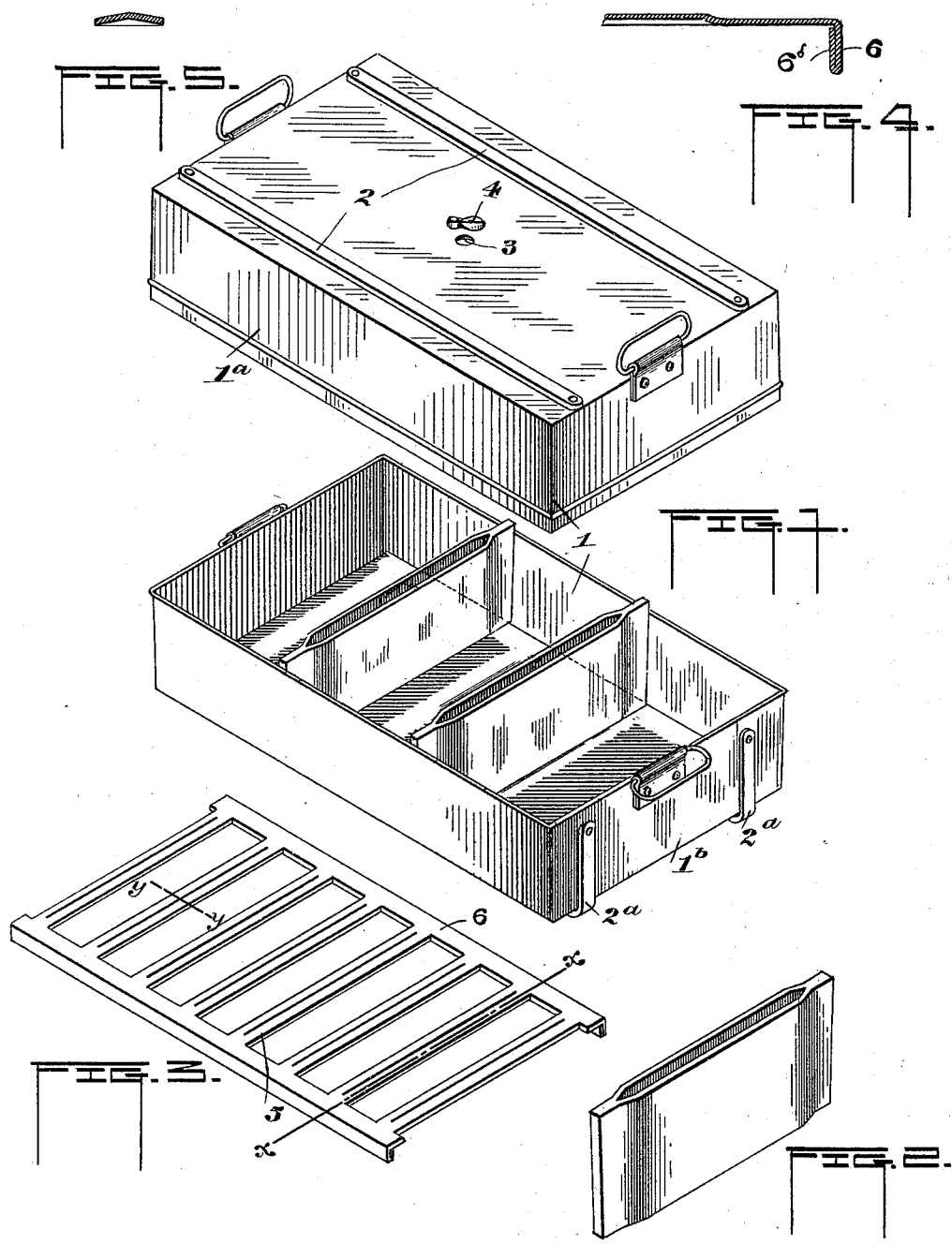

CHARLES A. HUDSON, OF SCHROON LAKE, NEW YORK.

BAKING-PAN.

SPECIFICATION forming part of Letters Patent No. 542,707, dated July 16, 1895.

Application filed August 20, 1894. Serial No. 520,853. (No model.)

*To all whom it may concern:*

Be it known that I, CHARLES A. HUDSON, a citizen of the United States of America, residing at Schroon Lake, in the county of Essex and State of New York, have invented certain new and useful Improvements in Baking-Pans, of which the following is a specification.

My invention relates to improvements in bake-pans for baking bread, meat, and the like; and the object of the invention is to improve the details of construction, whereby the durability of the pan is increased and it is rendered more effective in use.

The invention consists in the details of construction hereinafter described, and particularly pointed out in the claim.

The invention is illustrated in the accompanying drawings, in which—

Figure 1 is a perspective view of the pan with the cover or upper portion lifted to show the inside. Fig. 2 is a perspective view of one of the heat retaining or distributing partitions. Fig. 3 is a perspective view of the supplemental bottom. Fig. 4 is a section on line $x\,x$, and Fig. 5 is a section on line $y\,y$ of Fig. 3.

It has been found in baking bread in one loaf that the outer portion bakes before the center of the loaf is thoroughly cooked. To obviate this disadvantage I design to produce one or more removable partitions, which will divide the pan into two or more compartments in each of which a smaller batch of dough may be placed and will thus be more uniformly cooked. These partitions I prefer to form of the shape shown in Fig. 2, of comparatively thick metal with double walls, thus forming an air-space. These cross-partitions receive the heat and distribute it to the sides of the small loaves and aid in cooking the same uniformly.

In the drawings I show a baking-pan 1 of substantially the ordinary or any desired form embodying my improvements. Secured to both the top or upper portion $1^a$ and the bottom or lower portion $1^b$ are the strengthening-ribs 2 and $2^a$. The ribs 2 upon the upper portion run longitudinally thereof, terminating at the ends and being secured by riveting in the ordinary manner. These serve to keep the cover from being warped out of shape by the heat to which it is subjected. The ribs $2^a$ of the lower portion are extended beyond the ends, where they are bent upward and riveted to the end faces of the said lower section, as shown in Fig. 1. These, therefore, not only serve to keep the lower section from warping, but also to keep the bottom from being worn out when moved around on the oven bottom and to keep the ends from being pulled out of shape by the handles, which is very liable to happen where the end metal is unsupported.

In order to keep the contents of the pan in cooking off of the bottom and thus reduce the liability to burning, I provide a supplemental bottom. (Shown in detail in Figs. 3, 4, and 5.) This is extremely simple and consists of a single piece of sheet metal stamped or cut to the proper shape and without seam or joint. The central portions of the sheet of metal are cut away, leaving the cross-bars 5 and the side bars 6, and the cross-bars are preferably dished or bent into the shape shown in Fig. 5 in cross-section, whereby additional strength is imparted to them. The edges of the side bars 6 are bent downward, as shown at 6 in Fig. 4, and then turned upward again on the inside, as shown at $6^b$, whereby a flange of double thickness is provided, adapted to rest on the bottom of the pan to support the main portion of the supplemental bottom at a slight elevation.

A regulator 3 is provided in the top of the pan, which is provided with a cover 4, which may be swung to one side when the bread is to be browned.

Having thus described my invention, what I claim is—

A baking-pan consisting of the upper and lower sections, and the hollow partitions arranged in the lower section and forming a series of combined heat conducting and baking chambers.

In testimony whereof I affix my signature in presence of two witnesses.

CHARLES A. HUDSON.

Witnesses:
FRANK J. POTTER,
SAMUEL R. DUNTLEY.